United States Patent [19]
Silberkleit et al.

[11] Patent Number: 5,631,822
[45] Date of Patent: May 20, 1997

[54] INTEGRATED PLANAR MAGNETICS AND CONNECTOR

[75] Inventors: Lee I. Silberkleit, Redmond; David R. Perchlik, Bothell; Jason E. Douglass, North Bend, all of Wash.

[73] Assignee: Interpoint Corporation, Redmond, Wash.

[21] Appl. No.: 519,112

[22] Filed: Aug. 24, 1995

[51] Int. Cl.$^6$ .......................... H02M 1/00; H01H 85/02; H01H 61/00; H01H 71/16
[52] U.S. Cl. .............. 363/144; 336/200; 336/83
[58] Field of Search ................ 336/82, 83, 200; 363/144, 16, 20, 21

[56] References Cited

U.S. PATENT DOCUMENTS

| | | | |
|---|---|---|---|
| 4,262,328 | 4/1981 | Bloom et al. | 363/16 |
| 4,318,166 | 3/1982 | Bloom | 363/26 |
| 4,583,068 | 4/1986 | Dickens et al. | 336/82 |
| 4,709,316 | 11/1987 | Ngo et al. | 363/21 |
| 4,821,163 | 4/1989 | Bloom | 363/49 |
| 4,853,668 | 8/1989 | Bloom | 336/214 |
| 4,864,478 | 9/1989 | Bloom | 363/16 |
| 4,975,821 | 12/1990 | Lethellier | 363/21 |
| 5,017,902 | 5/1991 | Yerman et al. | 336/83 |
| 5,126,931 | 6/1992 | Jitaru | 363/21 |
| 5,168,440 | 12/1992 | Spreen | 363/144 |
| 5,179,365 | 1/1993 | Raggi | 336/83 |
| 5,321,380 | 6/1994 | Godek et al. | 336/200 |
| 5,331,536 | 7/1994 | Lane | 363/144 |
| 5,353,001 | 10/1994 | Meinel et al. | 336/83 |
| 5,386,206 | 1/1995 | Iwatani et al. | 336/200 |
| 5,402,098 | 3/1995 | Ohta et al. | 336/200 |

OTHER PUBLICATIONS

Xu Huang et al., "Design Techniques for Planar Windings with Low Resistances," 1995 IEEE, vol. 0-7803-2482-X/95, pp. 533-539.

*Primary Examiner*—Peter S. Wong
*Assistant Examiner*—Bao Q. Vu
*Attorney, Agent, or Firm*—Seed & Berry LLP

[57] ABSTRACT

The present invention provides a magnetics substrate for implementing a coupled transformer and inductor. In one version, the transformer and inductor are used in a DC to DC converter. The transformer includes primary and secondary windings, each comprising a set of planar windings coupled to one another in series and lying on planar surfaces of layers of the magnetics substrate. These planar windings are coaxially aligned along a transformer core axis which is orthogonal to the layers, and the primary and secondary windings are magnetically coupled to one another through a transformer core positioned along the transformer core axis. The inductor includes a set of planar windings coupled to one another in series and lying on planar surfaces of the layers. These planar windings are coaxially aligned along an inductor core axis which is orthogonal to the layers and is spaced apart from the transformer core axis, and they are magnetically coupled to one another through an inductor core positioned along the inductor core axis. The magnetics substrate includes an interconnect coupling the secondary transformer winding to the inductor. It also includes terminal pads lying on a lower planar surface of the magnetics substrate and coupled to the inductor and the primary and secondary transformer windings. Each terminal pad is constructed to receive and couple to a conductive offset pin extending orthogonally from a terminal pad on an upper surface of a first substrate coupled to a first substrate circuit. The conductive offset pins position the magnetics substrate and the first substrate in a spaced apart parallel relationship and also couple the transformer and inductor to the circuit of the first substrate.

25 Claims, 3 Drawing Sheets

INTEGRATED PLANAR MAGNETICS AND CONNECTOR

TECHNICAL FIELD

This invention relates generally to magnetics components, and, in particular, to substrates with planar magnetics for implementing magnetics components.

BACKGROUND OF THE INVENTION

Magnetics components such as transformers and inductors are often used in circuits. Transformers are useful in electrically isolating one circuit from another, and are also useful in convening a high voltage to a low voltage, or vice versa. Also, inductors are useful as energy storage elements, and as part of a resonant circuit with a capacitor. Thus, magnetics components are important in many circuits.

One conventional approach to implementing magnetics components in a circuit is to use surface-mountable discrete components. Such discrete magnetics components are generally larger in size than other discrete components because they often have many thick windings for handling large amounts of power and because they often use a ferrite core. Because of their relatively large size, and because they generate a relatively large amount of heat, discrete magnetics components are difficult to use in a compact environment. Also, because discrete magnetics components are surface mounted, there is a relatively high resistance between them when they are coupled together through a substrate such as a printed circuit board.

Another conventional approach to implementing magnetics components in a circuit is to use a magnetics component having planar windings printed in a spiral format on a printed circuit board. Although these magnetics components are used frequently because they are compact, they have been found to have a high leakage inductance and a high parasitic capacitance. As a result, many designers of magnetics components have moved away from implementing magnetics components using planar windings, and toward surface-mountable low-profile magnetics devices such as the one disclosed in U.S. Pat. No. 4,583,068, to Dickens et al. However, such low-profile magnetics devices are not as compact as is desirable.

For the foregoing reasons, there is a need in the an for an implementation of magnetics components which is highly compact and has a low leakage inductance and parasitic capacitance. Such an implementation should allow individual magnetics components to be coupled to one another with a relatively low resistance between them, and the resulting magnetics components should be able to handle relatively large amounts of heat.

SUMMARY OF THE INVENTION

In a preferred embodiment, the present invention provides a substantially planar magnetics substrate for implementing magnetics components. The magnetics substrate includes a plurality of layers in a substantially parallel relationship with one another. Each layer has upper and lower planar surfaces, and the upper planar surface of one of the layers is an upper planar surface of the magnetics substrate, while the lower planar surface of the one of the layers is a lower planar surface of the magnetics substrate. The magnetics substrate also includes a primary winding and a secondary winding. The primary winding comprises a primary set of one or more planar windings lying on planar surfaces of one or more of the layers and coupled to one another in series. The primary set planar windings are positioned to be coaxially aligned with one another along a transformer core axis which is orthogonal to the layers. Each primary set planar winding includes one or more turns and first and second ends, and a first terminal of the primary winding is the first end of one of the primary set planar windings, while a second terminal of the primary winding is the second end of one of the primary set planar windings. The secondary winding comprises a secondary set of one or more planar windings lying on planar surfaces of one or more of the layers and coupled to one another in series. The secondary set planar windings are positioned to be coaxially aligned with one another along the transformer core axis. Each secondary set planar winding includes one or more turns and first and second ends, and a first terminal of the secondary winding is the first end of the one of the secondary set planar windings, while a second terminal of the secondary winding is the second end of the one of the secondary set planar windings. The primary and secondary set planar windings are magnetically coupled to one another by their magnetic fluxes through a transformer core positioned along the transformer core axis when the turns of the primary and secondary set planar windings conduct current. In this manner the primary and secondary set planar windings may form a transformer. The magnetics substrate further includes an inductive set of one or more planar windings lying on planar surfaces of one or more of the layers and coupled to one another in series. The inductive set planar windings are positioned to be coaxially aligned with one another along an inductor core axis which is orthogonal to the layers and which is spaced apart from the transformer core axis. Each inductive set planar winding comprises one or more turns and first and second ends. The inductive set planar windings are magnetically coupled to one another by their magnetic fluxes through an inductor core positioned along the inductor core axis when the turns of the inductive set planar windings conduct current. In this manner the inductive set planar windings may form an inductor. A first inductor terminal is the first end of one of the inductive set planar windings, while a second inductor terminal is the second end of one of the inductive set planar windings. The magnetics substrate still further includes an interconnect coupling the second secondary winding terminal to the first inductor terminal. Finally, the magnetics substrate includes one or more terminal pads lying on the lower planar surface of the magnetics substrate and coupled to one or more of the terminals of the inductor and of the primary and secondary windings. Each of the terminal pads is constructed to receive a conductive offset pin extending orthogonally from a terminal pad on the upper surface of a first substrate. Each of the first substrate terminal pads is coupled to a first substrate circuit and a conductive offset pin. The conductive offset pins position the magnetics substrate and the first substrate in a spaced apart parallel relationship with one another and also couple the transformer and inductor to the circuit of the first substrate.

In another embodiment, the present invention provides a DC to DC converter for converting a supply voltage to an output voltage. The DC to DC converter includes a switching device having a first terminal, a second terminal for receiving a reference voltage, and a control terminal which receives a duty cycle signal which causes the switching device to periodically couple the first terminal to the second terminal. The DC to DC converter also includes first and second diodes, each having an anode and a cathode. The cathodes of the first and second diodes are coupled to one another. The DC to DC converter further includes a capacitor having a first terminal and a second terminal. The first capacitor terminal is coupled to the cathodes of the first and second diodes and provides the output voltage. The DC to DC converter still further includes a transformer and an inductor implemented in a magnetics assembly which includes a transformer core, an inductor core, and the previously described preferred magnetics substrate. The second primary winding and first secondary winding terminals of the transformer are coupled to the first switching device terminal and the anode of the first diode, respectively. Also, the second secondary winding and second inductor winding terminals are coupled to the anode of the second diode and the second capacitor terminal, respectively. The supply voltage periodically imposed across the primary winding of the transformer by the duty cycle signal imposes a corresponding voltage across the secondary winding of the transformer which, in turn, imposes the output voltage across the capacitor.

BRIEF DESCRIPTION OF THE DRAWINGS

These and other features of the present invention will become better understood with regard to the following description, appended claims, and accompanying drawings, where:

DETAILED DESCRIPTION OF THE INVENTION

The present invention recognizes that the sought-after implementation of magnetics components can be realized using planar magnetics. Such an implementation is compact, can handle relatively large amounts of heat, and has a low parasitic capacitance and leakage inductance.

Figure 1:
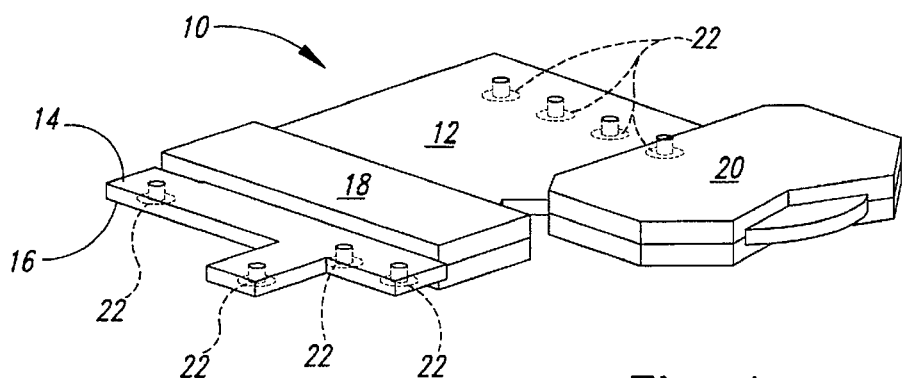
FIG. 1 is an isometric view of a preferred magnetics assembly according to the present invention.

A preferred embodiment of a magnetics assembly which realizes the advantages of the present invention is shown in FIG. 1. A magnetics assembly 10 includes a substantially planar magnetics substrate, such as a printed circuit board 12, having opposing upper and lower planar surfaces 14 and 16. The printed circuit board 12 includes a plurality of planar windings (not shown) for implementing a transformer in conjunction with a transformer core 18. The printed circuit board 12 also includes one or more planar windings (not shown) for implementing an inductor in conjunction with an inductor core 20. The transformer and inductor cores 18 and 20 are typically formed of a ferrous material. The transformer and inductor will be described in more detail below with respect to FIG. 4. Also, although the magnetics substrate described for use in this preferred embodiment is a printed circuit board, it will be understood by those with skill in the field of this invention that any magnetics substrate, including a flexible magnetics substrate, is also within the scope of this invention.

The printed circuit board 12 further includes a plurality of terminal and through-pads 22 lying on its lower planar surface 16. The pads 22 that are used as terminal pads are coupled to the planar windings (not shown) of the printed circuit board 12, while the pads 22 that are used as through-pads are not coupled to these planar windings (not shown).

Figure 2:
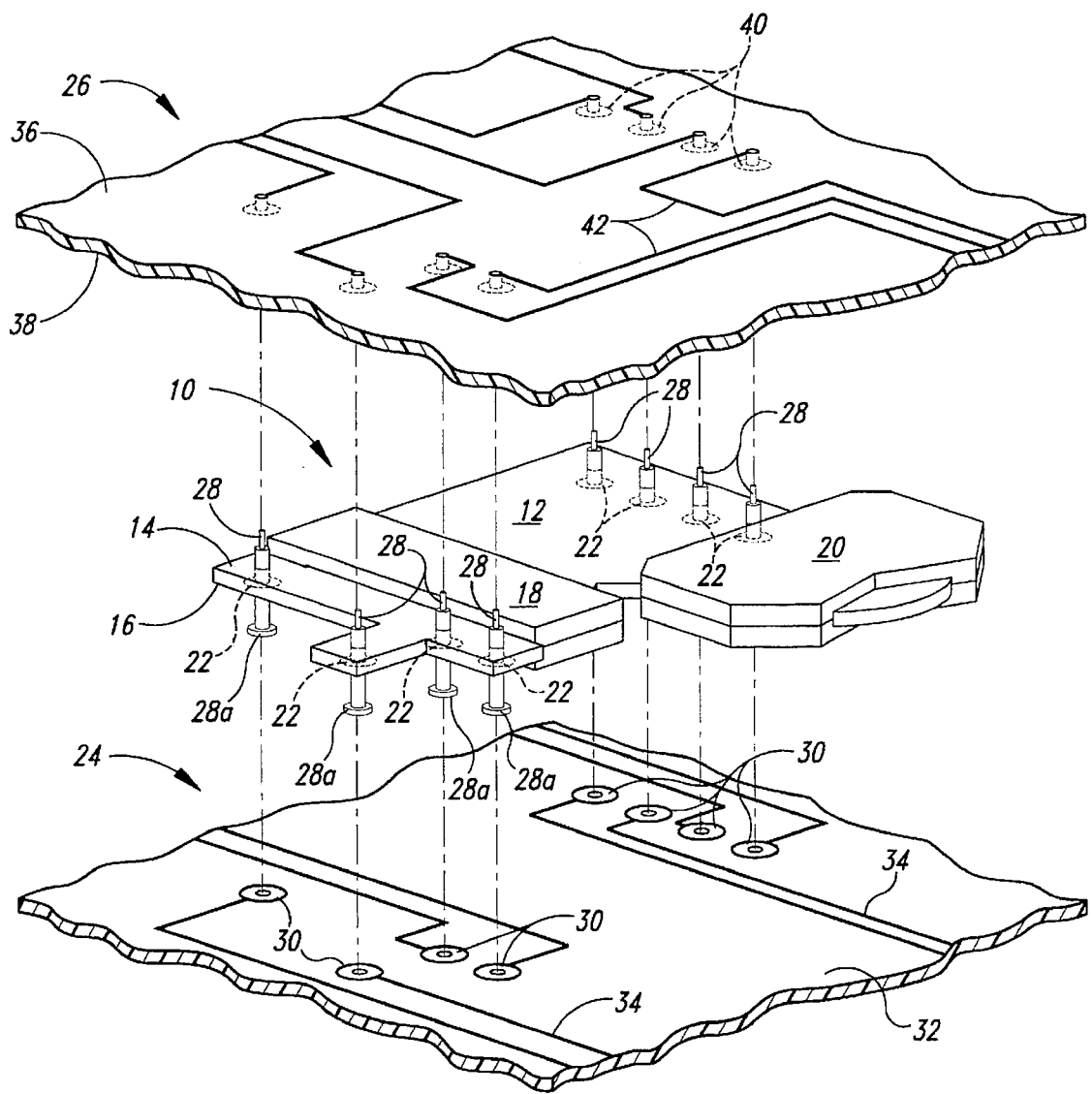
FIG. 2 is an exploded isometric view of the magnetics assembly of FIG. 1 and first and second substrates.

The pads 22 allow the printed circuit board 12 to be coupled to other substrates, as is shown in detail in FIG. 2. The printed circuit board 12 couples to a substantially planar first substrate 24 and a substantially planar second substrate 26 through one or more conductive offset pins 28 connected to and extending orthogonally through the pads 22 of the printed circuit board 12. Preferably, each conductive offset pin 28 has a flat head 28a which is received by a terminal pad 30 on an upper planar surface 32 of the first substrate 24. Each of the first substrate terminal pads 30 is coupled to a circuit 34 of the first substrate 24. The conductive offset pins 28 mechanically secure the printed circuit board 12 to the first substrate 24 such that the printed circuit board 12 and the first substrate 24 are positioned in a spaced-apart parallel relationship with one another. Since, as discussed above, the pads 22 of the printed circuit board 12 that are used as terminal pads are coupled to the planar windings (not shown) of the printed circuit board 12, and hence are coupled to the inductor and transformer (not shown) of the printed circuit board 12, the conductive offset pins 28 couple the circuit 34 of the first substrate 24 to the inductor and transformer (not shown) of the printed circuit board 12. Thus, the conductive offset pins 28 make the magnetics assembly 10 fully surface mountable, and hence highly compact.

The printed circuit board 12 also couples to the second substrate 26. The second substrate 26 has upper and lower planar surfaces 36 and 38, and also has a plurality of terminal pads 40 on its lower planar surface 38 coupled to a circuit 42. The conductive offset pins 28 extend orthogonally from the upper planar surface 14 of the printed circuit board 12 and connect to the terminal pads 40 on the lower planar surface 38 of the second substrate 26. In this manner, the conductive offset pins 28 position the printed circuit board 12 and the second substrate 26 in a spaced-apart parallel relationship with one another. Also in this manner, the inductor and transformer (not shown) of the printed circuit board 12 are coupled to the circuit 42 of the second substrate 26, and the circuit 34 of the first substrate 24 is coupled to the circuit 42 of the second substrate 26 through the conductive offset pins 28 and the pads 22 of the printed circuit board 12 that are used as through-pads.

Figure 3:
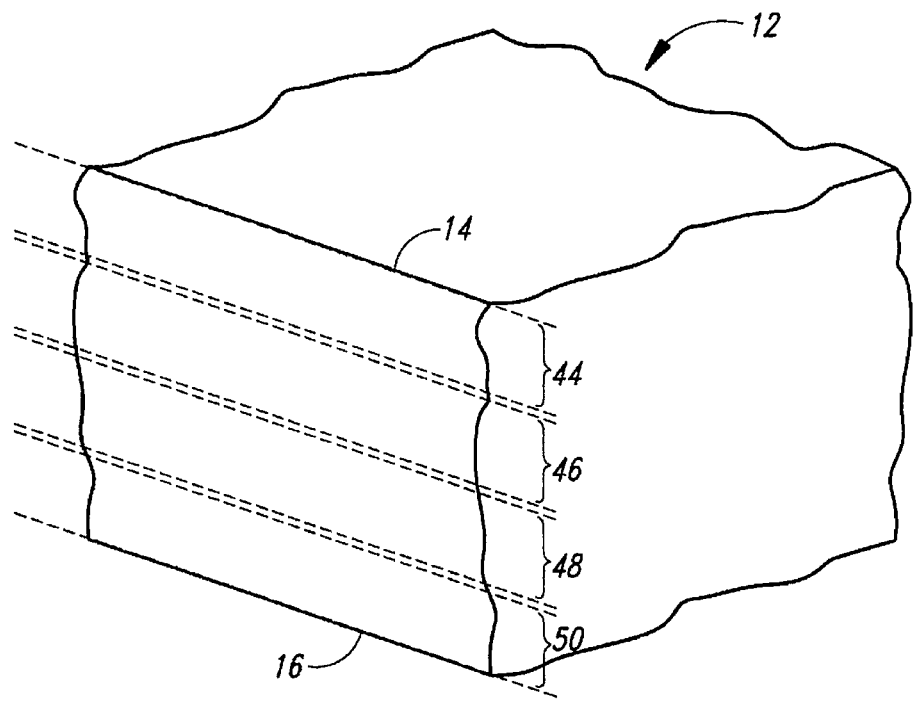
FIG. 3 is a detailed isometric view of a magnetics substrate from the preferred magnetics assembly of FIG. 1.

FIG. 3 shows the printed circuit board 12 of FIGS. 1 and 2 in more detail. Preferably, the printed circuit board 12 includes first, second, third and fourth layers 44, 46, 48 and 50 fixed to each other in a substantially parallel relationship with one another. Although this preferred embodiment will be described with respect to the printed circuit board 12 having four layers, those with skill in the field of this invention will understand that a magnetics substrate including any number of layers is within the scope of this invention. An upper planar surface of the first layer 44 is the upper planar surface 14 of the printed circuit board 12, while a lower planar surface of the fourth layer 50 is the lower planar surface 16 of the printed circuit board 12. Preferably, each of the first, second, third and fourth layers 44, 46, 48 and 50 comprises an insulating material available from Polyclad Corporation of Franklin, N.H., referred to as Tettra II (Part No. PCL-FR-370). Tettra II has a low coefficient of thermal expansion, which allows the printed circuit board 12 to withstand hot-spot temperatures of approximately 180° C. Tetra II also has a dielectric strength of approximately 1,300 volts per millimeter and a dielectric constant of approximately 4.4, which allows Tetra II to minimize capacitance between the layers 44, 46, 48 and 50, thereby reducing the parasitic capacitance of any magnetics components implemented in the layers 44, 46, 48 and 50 of the printed circuit board 12. A magnetics substrate such as the printed circuit board 12 is thus able to both handle relatively high temperatures and provide a relatively low parasitic capacitance.

Figure 4:
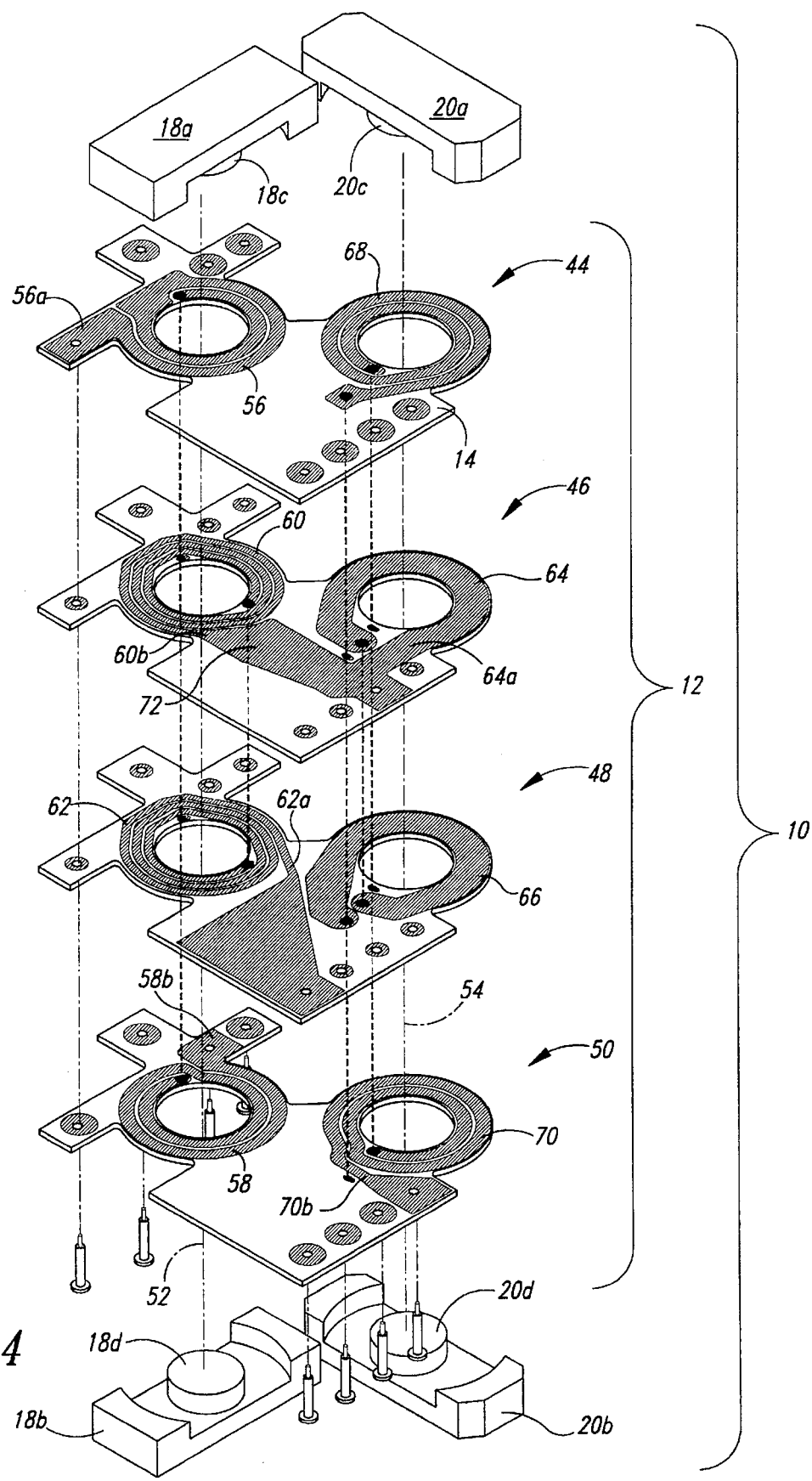
FIG. 4 is an exploded isometric view of the preferred magnetics assembly of FIG. 1.

FIG. 4 shows the magnetics assembly of FIGS. 1 and 2 in more detail. As discussed above, the magnetics assembly 10 includes a magnetics substrate such as the printed circuit board 12 which preferably comprises first, second, third and fourth layers 44, 46, 48 and 50. The magnetics assembly 10 also includes a transformer core 18 and an inductor core 20. Preferably, the transformer core 18 and the inductor core 20 comprise E-shaped half cores 18a and 18b and 20a and 20b, respectively, having columnar middle legs 18c and 18d and 20c and 20d, respectively. The preferred E-shaped transformer half cores 18a and 18b mate to the printed circuit board 12 through holes in each of the layers 44, 46, 48 and 50 along a transformer core axis 52, and the preferred E-shaped inductor half cores 20a and 20b mate to the printed circuit board 12 through holes in each of the layers 44, 46, 48 and 50 along an inductor core axis 54 which is spaced apart from the transformer core axis 52. Preferably, the middle legs 18c and 18d of the transformer half cores 18a and 18b contact one another when the transformer core 18 is mated to the printed circuit board 12. In contrast, the middle legs 20c and 20d of the inductor half cores 20a and 20b preferably have an air gap between them when the inductor core 20 mates to the printed circuit board 12. However, it will be understood that both the transformer core 18 and the inductor core 20 can function within the scope of this invention with or without an air gap, and therefore with or without a hole in the printed circuit board 12.

As discussed above, the printed circuit board 12 implements a transformer and an inductor. The transformer is formed with a primary winding which preferably is formed by a first planar winding 56 lying on the upper planar surface 14 of the first layer 44 coupled in series to a seventh planar winding 58 lying on an upper planar surface of the fourth layer 50. The transformer is also formed with a secondary winding which preferably is formed by a third planar winding 60 lying on an upper planar surface of the second layer 46 coupled in series to a fifth planar winding 62 lying on an upper planar surface of the third layer 48. The first, third, fifth and seventh planar windings 56, 60, 62 and 58 are coaxially aligned with one another along the transformer core axis 52 so that they are magnetically coupled to one another through the transformer core 18 when they conduct current. Each of these planar windings 56, 58, 60 and 62 comprises one or more turns and first and second ends. First and second terminals of the primary winding comprise the first end 56a of the first planar winding 56 and the second end 58b of the seventh planar winding 58, respectively, while first and second terminals of the secondary winding comprise the first end 62a of the fifth planar winding 62 and the second end 60b of the third planar winding 60. The inductor preferably is formed with a fourth planar winding 64 lying on the upper planar surface of the second layer 46 coupled in series to a sixth planar winding 66 lying on the upper planar surface of the third layer 48 coupled in series to a second planar winding 68 lying on the upper planar surface 14 of the first layer 44 coupled in series to an eighth planar winding 70 lying on the upper planar surface of the fourth layer 50. The second, fourth, sixth and eighth planar windings 68, 64, 66 and 70 are coaxially aligned with one another along the inductor core axis 54 so that they are magnetically coupled to one another through the inductor core 20 when they conduct current. Each of these planar windings 64, 66, 68 and 70 comprises one or more turns and first and second ends. First and second terminals of the inductor comprise the first end 64a of the fourth planar winding 64 and the second end 70b of the eighth planar winding 70, respectively. The transformer and the inductor are coupled at the second secondary transformer winding terminal 60b and the first inductor terminal 64a by an interconnect 72 preferably lying on the upper planar surface of the second layer 46.

The preferred transformer and inductor as described herein have relatively low leakage inductances for two reasons. First, because the first and seventh planar windings 56 and 58 of the primary winding of the transformer "sandwich" the third and fifth planar windings 60 and 62 of the secondary winding, the magnetic coupling between the primary and secondary windings is maximized. Second, because the windings of the transformer and inductor are planar, they magnetically couple to one another better than, for example, round windings. Better magnetic coupling means a lower leakage inductance.

The preferred transformer and inductor as described herein also have relatively low DC resistances for two reasons. First, each of the previously described planar windings has a winding resistance R, and each turn in each of these planar windings has a turn resistance r, an average circumference l, and a width w. It is known that the winding resistance R for a planar winding having N turns can be minimized if the turn resistance r for each of the N turns is equal to the turn resistance r for the other turns in the planar winding. The turn resistance r of any turn can be calculated as:

$$r = \frac{1}{\sigma w h} \qquad (1)$$

where σ is the conductivity of the conductor used to make the turn and h is the height of the conductor. Since only the average circumference l and the width w vary from turn to turn in a planar winding, the turn resistance r of each turn in a planar winding can be made equal to the turn resistance r of the other turns in the planar winding if the ratio of the average circumference l to the width w of the turn is made equal to the ratio of the average circumference l to the width w for the other turns in the planar winding. In this manner, the present invention minimizes the winding resistance R of each planar winding. Second, since the turn resistance r of each turn in each planar winding is directly proportional to the average circumference l of the turn, the planar windings are preferably made circular so as to minimize the average circumference l of each turn in each planar winding and thereby minimize the winding resistance R of each planar winding. The preferred transformer and inductor as described herein still further have a relatively low interconnection resistance because, since the resistance of the interconnect 72 is inversely proportional to its width, the width of the interconnect 72 is made as large as possible to minimize the interconnection resistance between the transformer and inductor.

Figure 5:
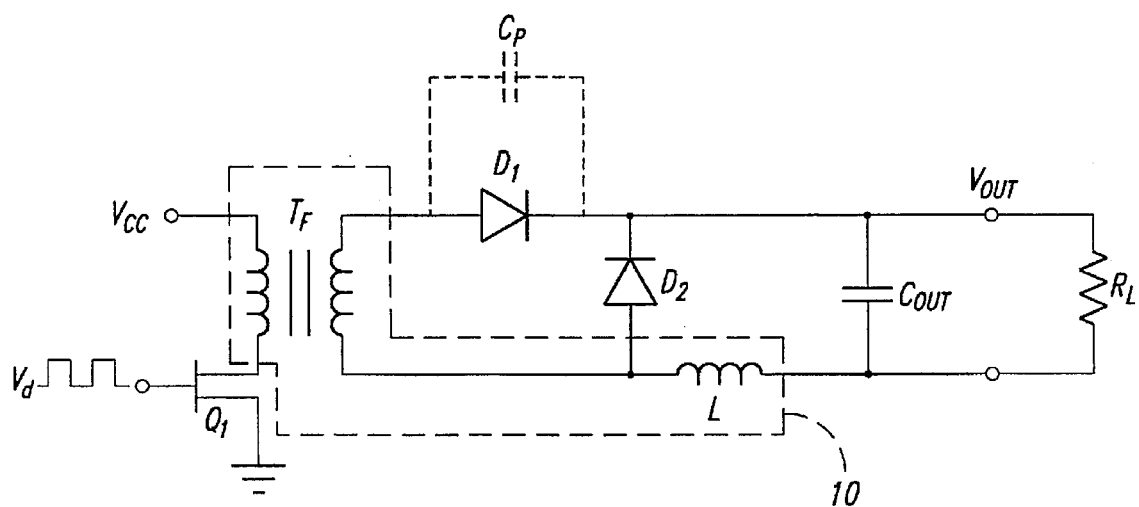
FIG. 5 is a circuit schematic of a DC to DC converter according to the present invention.

The present invention has many useful applications in circuits requiring magnetics components. An embodiment of one such circuit is shown in FIG. 5. A DC to DC converter for converting a supply voltage $V_{cc}$ to an output voltage $V_{out}$ includes the previously described preferred magnetics assembly 10 which includes the transformer $T_f$ coupled to the inductor L. A switching device, such as a transistor $Q_1$, receiving a duty cycle signal $V_d$, periodically turns on and imposes the supply voltage $V_{cc}$ across, and causes current to flow in, the primary winding. Because the primary and secondary windings of the transformer $T_f$ are magnetically coupled, the flow of current in the primary winding causes a corresponding flow of current out of the secondary winding. This flow of current forward biases a first diode $D_1$, while a second diode $D_2$ remains reverse biased. This flow of current also charges a capacitor $C_{out}$, drives a load $R_L$, and circulates back to the secondary winding through the inductor L. When the transistor $Q_1$ subsequently turns off, the rate of change of current through the primary winding is negative. This negative rate of change reverses the polarity of the voltage across the primary winding and causes a corresponding reversal of polarity of the voltage across the secondary winding. As a consequence, the first diode $D_1$ reverse biases and the second diode $D_2$ forward biases. A current spike caused by the reversal of the polarity of the voltage across the secondary winding flows into the secondary winding through the second diode $D_2$ and through a parasitic capacitance $C_p$ of the first diode $D_1$. Also, energy stored in the inductor L causes current to flow through the second diode $D_2$ to the load $R_L$. Thus, the inductor L assists the capacitor $C_{out}$ in driving the load $R_L$. When the transistor $Q_1$ is again turned on by the duty cycle signal $V_d$, the cycle starts over. By varying the pulse width of pulses in the duty cycle signal $V_d$, an average of the output voltage $V_{out}$ over time will be some fraction of the supply voltage $V_{cc}$.

The previously described preferred embodiment of the present invention has many advantages. These include providing a highly compact and heat-resistant implementation of a transistor and an inductor having a low parasitic capacitance, a low leakage inductance, a low DC resistance, and a low interconnection resistance.

Although the present invention has been described with reference to a preferred embodiment, the invention is not limited to this preferred embodiment. Rather, the invention is limited only by the appended claims, which include within their scope all equivalent devices or methods which operate according to the principles of the invention as described.

We claim:

1. A magnetics assembly for implementing magnetics components, the magnetics components being for use in association with a circuit of a substantially planar first substrate having an upper planar surface and a plurality of terminal pads thereon, each of the plurality of terminal pads being coupled to the first substrate circuit and receiving a conductive offset pin, each conductive offset pin extending orthogonally from its terminal pad, the magnetics assembly comprising:

a transformer core;
an inductor core; and
a substantially planar magnetics substrate comprising:
   a plurality of layers positioned in a substantially parallel relationship with one another, each layer having upper and lower planar surfaces, the upper planar surface of one of the plurality of layers being an upper planar surface of the magnetics substrate, the lower planar surface of one of the plurality of layers being a lower planar surface of the magnetics substrate;
   a primary winding comprising a primary set of one or more planar windings lying on planar surfaces of one or more of the layers and being coupled to one another in series and positioned to be coaxially aligned with one another along a transformer core axis which is orthogonal to the layers, each primary set planar winding comprising one or more turns and first and second ends, a first terminal of the primary winding being the first end of one of the primary set planar windings, a second terminal of the primary winding being the second end of one of the primary set planar windings;
   a secondary winding comprising a secondary set of one or more planar windings lying on planar surfaces of one or more of the layers and being coupled to one another in series and positioned to be coaxially aligned with one another along the transformer core axis, each secondary set planar winding comprising one or more turns and first and second ends, a first terminal of the secondary winding being the first end of one of the secondary set planar windings, a second terminal of the secondary winding being the second end of one of the secondary set planar windings, the primary and secondary set planar windings being magnetically coupled to one another by their magnetic fluxes through the transformer core positioned along the transformer core axis when the turns of the primary and secondary set planar windings conduct current so as to form a transformer;
   an inductive set of one or more planar windings lying on planar surfaces of one or more of the layers and being coupled to one another in series and positioned to be coaxially aligned with one another along an inductor core axis which is orthogonal to the layers and is spaced apart from the transformer core axis, each inductive set planar winding comprising one or more turns and first and second ends, the inductive set planar windings being magnetically coupled to one another by their magnetic fluxes through the inductor core positioned along the inductor core axis when the turns of the inductive set planar windings conduct current so as to form an inductor, a first inductor terminal being the first end of one of the inductive set planar windings, a second inductor terminal being the second end of one of the inductive set planar windings;
   one or more terminal pads lying on the lower planar surface of the magnetics substrate and being coupled to one or more of the terminals of the inductor and of the primary and secondary windings, each of the terminal pads being constructed to receive one of the conductive offset pins extending orthogonally from one of the terminals pads of the first substrate such that the magnetics substrate and the first substrate are positioned in a spaced-apart parallel relationship with one another, the conductive offset pins thereby coupling the transformer and inductor of the magnetics substrate to the circuit of the first substrate; and
   an interconnect coupling the second secondary winding terminal to the first inductor terminal.

2. The magnetics assembly of claim 1 wherein the primary winding sandwiches the secondary winding so as to maximize the magnetic coupling between the primary and secondary set planar windings and thereby minimize a leakage inductance of the transformer.

3. The magnetics assembly of claim 1 wherein the magnetics substrate further comprises one or more through-pads lying on its lower planar surface, each of the through-pads being constructed to receive one of the conductive offset pins extending orthogonally from one of the terminal pads of the first substrate such that the magnetics substrate and the first substrate are positioned in their spaced-apart parallel relationship with one another, each conductive offset pin extending orthogonally through the magnetics substrate between its lower and upper planar surfaces to connect to a terminal pad on a lower planar surface of a substantially planar second substrate such that the magnetics substrate and the second substrate are positioned in a spaced-apart parallel relationship with one another, the second substrate having a circuit coupled to its terminal pads, the conductive offset pins thereby coupling the circuits of the first and secondary substrates.

4. The magnetics assembly of claim 1 wherein each planar winding has a winding resistance and each turn in each planar winding has an average circumference and a width, the ratio of the average circumference to the width for each turn in a planar winding being equal to the ratio of the average circumference to the width for every other turn in the planar winding, thereby minimizing the winding resistance of each planar winding.

5. The magnetics assembly of claim 1 wherein each planar winding has a winding resistance and each turn in each planar winding has a turn resistance and an average circumference, each turn in each planar winding being circular so as to minimize its average circumference, thereby minimizing the turn resistance of each turn in each planar winding and minimizing the winding resistance of each planar winding.

6. The magnetics assembly of claim 1 wherein each layer comprises an insulating material having a low coefficient of thermal expansion and a dielectric strength of approximately 1,300 volts per millimeter and a dielectric constant of approximately 4.4, each layer thereby minimizing capacitance between the layers and allowing hot-spot temperatures of approximately 180° Celsius in the magnetics substrate.

7. A substantially planar magnetics substrate for implementing magnetics components, the magnetics components being for use in association with a circuit of a substantially planar first substrate having an upper planar surface and a plurality of terminal pads thereon, each of the plurality of terminal pads being coupled to the first substrate circuit and receiving a conductive offset pin, each conductive offset pin extending orthogonally from its terminal pad, the magnetics substrate comprising:

a plurality of layers positioned in a substantially parallel relationship with one another, each layer having upper and lower planar surfaces, the upper planar surface of one of the plurality of layers being an upper planar surface of the magnetics substrate, the lower planar surface of one of the plurality of layers being a lower planar surface of the magnetics substrate;

a primary winding comprising a primary set of one or more planar windings lying on planar surfaces of one or more of the layers and being coupled to one another in series and positioned to be coaxially aligned with one another along a transformer core axis which is orthogonal to the layers, each primary set planar winding comprising one or more turns and first and second ends, a first terminal of the primary winding being the first end of one of the primary set planar windings, a second terminal of the primary winding being the second end of one of the primary set planar windings;

a secondary winding comprising a secondary set of one or more planar windings lying on planar surfaces of one or more of the layers and being coupled to one another in series and positioned to be coaxially aligned with one another along the transformer core axis, each secondary set planar winding comprising one or more turns and first and second ends, a first terminal of the secondary winding being the first end of one of the secondary set planar windings, a second terminal of the secondary winding being the second end of one of the secondary set planar windings, the primary and secondary set planar windings being magnetically coupled to one another by their magnetic fluxes when the turns of the primary and secondary set planar windings conduct current so that the primary and secondary set planar windings may form a transformer when a transformer core is positioned along the transformer core axis;

an inductive set of one or more planar windings lying on planar surfaces of one or more of the layers and being coupled to one another in series and positioned to be coaxially aligned with one another along an inductor core axis which is orthogonal to the layers and is spaced apart from the transformer core axis, each inductive set planar winding comprising one or more turns and first and second ends, the inductive set planar windings being magnetically coupled to one another by their magnetic fluxes when the turns of the inductive set planar windings conduct current so that the inductive set planar windings may form an inductor when an inductor core is positioned along the inductor core axis, a first inductor terminal being the first end of one of the inductive set planar windings, a second inductor terminal being the second end of one of the inductive set planar windings;

one or more terminal pads lying on the lower planar surface of the magnetics substrate and being coupled to one or more of the terminals of the inductor and of the primary and secondary windings, each of the terminal pads being constructed to receive one of the conductive offset pins extending orthogonally from one of the terminals pads of the first substrate such that the magnetics substrate and the first substrate are positioned in a spaced-apart parallel relationship with one another, the conductive offset pins thereby coupling the transformer and inductor to the circuit of the first substrate; and an interconnect coupling the second secondary winding terminal to the first inductor terminal.

8. The magnetics substrate of claim 7 wherein the primary winding sandwiches the secondary winding so as to maximize the magnetic coupling between the primary and secondary set planar windings and thereby minimize a leakage inductance of the transformer.

9. The magnetics substrate of claim 7, further comprising one or more through-pads lying on the lower planar surface of the magnetics substrate, each of the through-pads being constructed to receive one of the conductive offset pins extending orthogonally from one of the terminal pads of the first substrate such that the magnetics substrate and the first substrate are positioned in their spaced-apart parallel relationship with one another, each conductive offset pin extending orthogonally through the magnetics substrate between its lower and upper planar surfaces to couple to a terminal pad on a lower planar surface of a substantially planar second substrate such that the magnetics substrate and the second substrate are positioned in a spaced-apart parallel relationship with one another, the second substrate having a circuit coupled to its terminal pads, the conductive offset pins thereby coupling the circuits of the first and second substrates.

10. The magnetics substrate of claim 7 wherein each planar winding has a winding resistance and each turn in each planar winding has an average circumference and a width, the ratio of the average circumference to the width for each turn in a planar winding being equal to the ratio of the average circumference to the width for every other turn in the planar winding, thereby minimizing the winding resistance of each planar winding.

11. The magnetics substrate of claim 7 wherein each planar winding has a winding resistance and each turn in each planar winding has a turn resistance and an average circumference, each turn in each planar winding being circular so as to minimize its average circumference, thereby minimizing the turn resistance of each turn in each planar winding and minimizing the winding resistance of each planar winding.

12. The magnetics substrate of claim 7 wherein each layer comprises an insulating material having a low coefficient of thermal expansion and a dielectric strength of approximately 1,300 volts per millimeter and a dielectric constant of approximately 4.4, each layer thereby minimizing capacitance between the layers and allowing hot-spot temperatures of approximately 180° Celsius in the magnetics substrate.

13. A substantially planar magnetics substrate for implementing a magnetics component, the magnetics component being for use in association with a circuit of a substantially planar first substrate having an upper planar surface and a plurality of terminal pads thereon, each of the plurality of terminal pads being coupled to the first substrate circuit and receiving a conductive offset pin, each conductive offset pin extending orthogonally from its terminal pad, the magnetics substrate comprising:

a plurality of layers positioned in a substantially parallel relationship with one another, each layer having upper and lower planar surfaces, the upper planar surface of one of the plurality of layers being an upper planar surface of the magnetics substrate, the lower planar surface of one of the plurality of layers being a lower planar surface of the magnetics substrate;

a primary winding comprising a primary set of one or more planar windings lying on planar surfaces of one or more of the layers and being coupled to one another in series and positioned to be coaxially aligned with one another along a transformer core axis which is orthogonal to the layers, each primary set planar winding comprising one or more turns and first and second ends, a first terminal of the primary winding being the first end of one of the primary set planar windings, a second terminal of the primary winding being the second end of one of the primary set planar windings;

a secondary winding comprising a secondary set of one or more planar windings lying on planar surfaces of one or more of the layers and being coupled to one another in series and positioned to be coaxially aligned with one another along the transformer core axis, each secondary set planar winding comprising one or more turns and first and second ends, a first terminal of the secondary winding being the first end of one of the secondary set planar windings, a second terminal of the secondary winding being the second end of one of the secondary set planar windings, the primary and secondary set planar windings being magnetically coupled to one another by their magnetic fluxes when the turns of the primary and secondary set planar windings conduct current so that the primary and secondary set planar windings may form a transformer when a transformer core is positioned along the transformer core axis; and one or more terminal pads lying on the lower planar surface of the magnetics substrate and being coupled to one or more of the terminals of the primary and secondary windings, each of the terminal pads being constructed to receive one of the conductive offset pins extending orthogonally from one of the terminals pads of the first substrate such that the magnetics substrate and the first substrate are positioned in a spaced-apart parallel relationship with one another, the conductive offset pins thereby coupling the transformer to the circuit of the first substrate.

14. The magnetics substrate of claim 13 wherein the primary winding sandwiches the secondary winding so as to maximize the magnetic coupling between the primary and secondary set planar windings and thereby minimize a leakage inductance of the transformer.

15. The magnetics substrate of claim 13, further comprising one or more through-pads lying on the lower planar surface of the magnetics substrate, each of the through-pads being constructed to receive one of the conductive offset pins extending orthogonally from one of the terminal pads of the first substrate such that the magnetics substrate and the first substrate are positioned in their spaced-apart parallel relationship with one another, each conductive offset pin extending orthogonally through the magnetics substrate between its lower and upper planar surfaces to couple to a terminal pad on a lower planar surface of a substantially planar second substrate such that the magnetics substrate and the second substrate are positioned in a spaced-apart parallel relationship with one another, the second substrate having a circuit coupled to its terminal pads, the conductive offset pins thereby coupling the circuits of the first and second substrates.

16. The magnetics substrate of claim 13 wherein each planar winding has a winding resistance and each turn in each planar winding has an average circumference and a width, the ratio of the average circumference to the width for each turn in a planar winding being equal to the ratio of the average circumference to the width for every other turn in the planar winding, thereby minimizing the winding resistance of each planar winding.

17. The magnetics substrate of claim 13 wherein each planar winding has a winding resistance and each turn in each planar winding has a turn resistance and an average circumference, each turn in each planar winding being circular so as to minimize its average circumference, thereby minimizing the turn resistance of each turn in each planar winding and minimizing the winding resistance of each planar winding.

18. The magnetics substrate of claim 13 wherein each layer comprises an insulating material having a low coefficient of thermal expansion and a dielectric strength of approximately 1,300 volts per millimeter and a dielectric constant of approximately 4.4, each layer thereby minimizing capacitance between the layers and allowing hot-spot temperatures of approximately 180° Celsius in the magnetics substrate.

19. A substantially planar magnetics substrate for implementing a magnetics component, the magnetics component being for use in association with a circuit of a substantially planar first substrate having an upper planar surface and a plurality of terminal pads thereon, each of the plurality of terminal pads being coupled to the first substrate circuit and receiving a conductive offset pin, each conductive offset pin extending orthogonally from its terminal pad, the magnetics substrate comprising:

a plurality of layers positioned in a substantially parallel relationship with one another, each layer having upper and lower planar surfaces, the upper planar surface of one of the plurality of layers being an upper planar surface of the magnetics substrate, the lower planar surface of one of the plurality of layers being a lower planar surface of the magnetics substrate;

an inductive set of one or more planar windings lying on planar surfaces of one or more of the layers and being coupled to one another in series and positioned to be coaxially aligned with one another along an inductor core axis which is orthogonal to the layers, each inductive set planar winding comprising one or more turns and first and second ends, the inductive set planar windings being magnetically coupled to one another by their magnetic fluxes when the turns of the inductive set planar windings conduct current so that the inductive set planar windings may form an inductor when an inductor core is positioned along the inductor core axis, a first inductor terminal being the first end of one of the inductive set planar windings, a second inductor terminal being the second end of one of the inductive set planar windings; and one or more terminal pads lying on the lower planar surface of the magnetics substrate and being coupled to one or more of the terminals of the inductor, each of the terminal pads being constructed to receive one of the conductive offset pins extending orthogonally from one of the terminals pads of the first substrate such that the magnetics substrate and the first substrate are positioned in a spaced-apart parallel relationship with one another, the conductive offset pins thereby coupling the inductor to the circuit of the first substrate.

20. The magnetics substrate of claim 19, further comprising one or more through-pads lying on the lower planar surface of the magnetics substrate, each of the through-pads being constructed to receive one of the conductive offset pins extending orthogonally from one of the terminal pads of the first substrate such that the magnetics substrate and the first substrate are positioned in their spaced-apart parallel relationship with one another, each conductive offset pin extending orthogonally through the magnetics substrate between its lower and upper planar surfaces to couple to a terminal pad on a lower planar surface of a substantially planar second substrate such that the magnetics substrate and the second substrate are positioned in a spaced-apart parallel relationship with one another, the second substrate having a circuit coupled to its terminal pads, the conductive offset pins thereby coupling the circuits of the first and second substrates.

21. The magnetics substrate of claim 19 wherein each planar winding has a winding resistance and each turn in each planar winding has an average circumference and a width, the ratio of the average circumference to the width for each turn in a planar winding being equal to the ratio of the average circumference to the width for every other turn in the planar winding, thereby minimizing the winding resistance of each planar winding.

22. The magnetics substrate of claim 19 wherein each planar winding has a winding resistance and each turn in each planar winding has a turn resistance and an average circumference, each turn in each planar winding being circular so as to minimize its average circumference, thereby minimizing the turn resistance of each turn in each planar winding and minimizing the winding resistance of each planar winding.

23. The magnetics substrate of claim 19 wherein each layer comprises an insulating material having a low coefficient of thermal expansion and a dielectric strength of approximately 1,300 volts per millimeter and a dielectric constant of approximately 4.4, each layer thereby minimizing capacitance between the layers and allowing hot-spot temperatures of approximately 180° Celsius in the magnetics substrate.

24. A stacked assembly of substrates for implementing magnetics components, the stacked assembly comprising:

a substantially planar first substrate having a circuit coupled to a plurality of terminal pads on an upper planar surface of the first substrate;

a substantially planar second substrate parallel to the first substrate and having a circuit coupled to a plurality of terminal pads on a lower planar surface of the second substrate;

a transformer core;

an inductor core;

a magnetics substrate parallel to and interposed between the first and second substrates, the magnetics substrate having primary and secondary windings each having first and second terminals, the transformer core being positioned to magnetically couple the primary and secondary windings to one another so as to form a transformer, the magnetics substrate also having an inductive set of one or more windings, the inductor core being positioned to magnetically couple the inductive set windings to one another so as to form an inductor having first and second terminals, the first and second terminals of the inductor and a plurality of the terminals of the primary and secondary windings being coupled to a plurality of terminal pads on upper and lower planar surfaces of the magnetics substrate, the magnetics substrate further having one or more through-pads on its upper and lower planar surfaces, the pads of the substrates being axially aligned in a plurality of groups along axes which are spaced apart from one another and which are orthogonal to the substrates; and a plurality of conductive offset pins each fixedly connected to an axially aligned group of pads on the planar surfaces of the substrates such that the substrates are fixed in a spaced-apart parallel relationship with one another by the conductive offset pins extending orthogonally from the terminal pads on the upper planar surface of the first substrate through the terminal and through-pads on the lower and upper planar surfaces of the magnetics substrate and to the terminal pads on the lower planar surface of the second substrate, one or more of the conductive offset pins thereby coupling the circuits of the first and second substrates through the through-pads of the magnetics substrate, the remainder of the conductive offset pins thereby coupling the circuits of the first and second substrates to the transformer and inductor of the magnetics substrate.

25. The stacked assembly of substrates of claim 24 wherein the primary winding sandwiches the secondary winding so as to maximize magnetic coupling between the primary and secondary windings and thereby minimize a leakage inductance of the transformer.

* * * * *

UNITED STATES PATENT AND TRADEMARK OFFICE
Certificate

Patent No. 5,631,822

Patented: May 20, 1997

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Lee I. Silberkleit, Redmond, WA; David R. Perchlik, Bothell, WA; Jason E. Douglass, North Bend, WA; Jay A. Kuehny, Redmond, WA; and James W. Dunlap, Woodinville, WA.

Signed and Sealed this Twenty-sixth Day of February 2002.

ROBERT NAPPI
*Supervisory Patent Examiner*
Art Unit 2837